United States Patent [19]

Yudelson et al.

[11] Patent Number: 4,994,304

[45] Date of Patent: Feb. 19, 1991

[54] METHOD OF HARDENING

[75] Inventors: Joseph S. Yudelson; Joseph A. Verdone, both of Rochester, N.Y.

[73] Assignee: Eastman Kodak Company, Rochester, N.Y.

[21] Appl. No.: 476,230

[22] Filed: Feb. 7, 1990

[51] Int. Cl.$^5$ .............................................. H01F 10/02
[52] U.S. Cl. .................................... 427/127; 427/128; 427/130; 427/131; 427/255.1; 427/255.4; 427/340; 427/400
[58] Field of Search ........................ 427/127, 128–132, 427/48, 340, 333, 421, 255.1, 255.4, 400; 428/694, 900; 252/62.54

[56] References Cited

U.S. PATENT DOCUMENTS

| | | | |
|---|---|---|---|
| 3,366,505 | 1/1968 | Bisschops et al. | 427/340 X |
| 4,324,177 | 4/1982 | Tsuji et al. | 100/155 |
| 4,515,828 | 5/1985 | Economy et al. | 427/82 |
| 4,642,242 | 2/1987 | Solomon | 427/340 X |

*Primary Examiner*—Bernard Pianalto
*Attorney, Agent, or Firm*—Doreen M. Wells

[57] ABSTRACT

A method of increasing the hardness of a polyurethane medium containing a polyisocyanate, such as a magnetic tape or disk, by contacting the medium with an aldehyde and an acid.

4 Claims, No Drawings

METHOD OF HARDENING

BACKGROUND OF THE INVENTION

The hardening of magnetic tapes and disks is an important consideration with respect to the durability of such materials when used with various tape and disk drives and magnetic recording heads. The hardening process that is used in virtually all magnetic tapes and disks containing a polyurethane medium is based on the reaction of isocyanate (—NCO) groups and hydroxyl (—OH) groups to form urethane (—NHCOO—) bonds.

The hardness of magnetic tapes and disks that can be achieved by such hardening process is generally less than desired. Inadequate hardness can cause excessive medium wear rate and degrade magnetic performance. It would be highly desirable to provide a simple method to increase the hardness of magnetic disks and tapes.

SUMMARY OF THE INVENTION

We have discovered that magnetic disks and tapes can be post hardened by treating them in an atmosphere composed of an aldehyde and an acid.

More particularly, in accordance with this invention, there is provided a method of increasing the hardness of a polyisocyanate containing polyurethane medium by contacting the medium with an aldehyde and an acid. The method is simple and provides a dramatic increase in the hardness of the medium.

DETAILED DESCRIPTION OF PREFERRED EMBODIMENTS

The description which follows primarily concerns the hardening of magnetic disks and tapes. In addition, the invention is also useful in conjunction with other magnetic and non-magnetic polyurethane media containing polyisocyanate groups.

The polyurethane media which can be hardened in accordance with this invention are those containing polyisocyanate groups. Such polyisocyanates are used in most magnetic disks and tapes as hardening agents. Widely used polyisocyanate hardening agents are available under the tradename Mondur from Mobay and contain three isocyanate groups per molecule.

Aldehydes useful in the practice of this invention include formaldehyde, acetaldehyde, propionaldehyde, butyraldehyde, valeraldehyde, hexanal, heptanal, benzaldehyde and the like and bisaldehydes such as glyoxal, malonaldehyde, glutaraldehyde, succinaldehyde and the like. The preferred aldehyde is formaldehyde. However, the hardness increase resulting from the use of bisaldehydes such as gloxal and glutaraldehyde was particularly surprising in view of their much lower volatility than formaldehyde.

It is believed that a wide range of acids can be used. Preferred acids are those exhibiting an acid constant (pKa) greater than about $10^{-4}$. The reason for this is that weaker acids do not effectively convert urea to its salt form which is believed to react with the aldehyde to form methylene bridges in accordance with one hypothetical mechanism discussed below. Suitable acids include carboxylic acids such as acetic acid, formic acid, propionic acid, butyric acid, valeric acid and the like.

According to this invention, the above-described polyurethane medium is contacted with an aldehyde and an acid to increase the hardness of the medium. The aldehyde and acid preferably are in the form of a gaseous vapor, although it is contemplated that one or both can be in liquid form. Sufficient contact to effect hardening can conveniently be achieved by inserting the polyurethane medium into an atmosphere comprising the aldehyde and the acid. Contact times of up to about two hours at room temperature have been found to be effective to increase hardness although longer contact times and elevated temperatures may be desirable under some circumstances. Alternatively, it is believed that increased hardness can be obtained by incorporating soluble aldehydes, particularly bisaldehydes, and the acid into coating solvents conventionally used in formulating magnetic coating compositions such as cyclohexanone, tetrahydrofuran, toluene, methyl ethyl ketone, and the like.

As is evident from the examples set forth below, the polyurethane medium must contain a polyisocyanate for the above-described post-treatment hardening to be effective. As noted above, urethane bonds form by the reaction of isocyanate groups and hydroxyl groups present on one or more binders present in the magnetic formulation. While it is possible, at least in theory, to form an infinite, cross-linked network, the isocyanate group tends to react with the hydroxyl group in the presence of water to form a urea group. While applicants do not wish to be bound by theoretical mechanisms, it is believed that the increased hardening observed in the practice of the present invention results from a methylene bridging or crosslinking reaction between urea groups, i.e.,

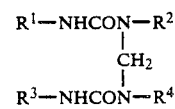

which are formed by the reaction of isocyanate groups and water.

The following examples further illustrate the invention.

EXAMPLE 1 AND COMPARATIVE EXAMPLES A-D

Magnetic disks supplied by the Verbatim Corporation that contained a polyisocyanate hardening agent were placed in closed beakers each of which contained 75 ml of the following: (A) control; (B) 37% formaldehyde; (C) glacial acetic acid; (D) formaldehyde and ammonium hydroxide mixture (1:1); and Example (1) glacial acetic acid, 37% formaldehyde mixture. They were stored under these conditions for three days at room temperature after which time the disks were removed and equilibrated with the laboratory atmosphere for several hours. They were tested for hardness by the wipe test which consists of a cotton tipped swab (Q-tip) dipped in cyclohexanone and wiped across the disk surface with a 5 gram force. The number of wipes are counted to the point where the swab contains a visible deposit of the magnetic coating. The results were as follows:

| Sample | No. of Wipes |
| --- | --- |
| A | 2 |
| B | 3 |
| C | 3 |
| D | 2 |

-continued

| Sample | No. of Wipes |
|---|---|
| Example 1 | 5 |

EXAMPLES 2-3

The experiment described above was carried out except that the samples were incubated at 58° C. for 2 hours and 18 hours. In the 2 hour experiment, the control failed at 2 wipes whereas the sample incubated in the formaldehyde acetic atmosphere resisted 4 wipes and showed failure at 6 wipes. Approximately the same results were noted after 18 hours indicating that the reaction is relatively rapid.

EXAMPLES 4-5

The experiments of Examples 2 and 3 were carried out but with the use of 40% glyoxal and 50% glutaraldehyde in place of formaldehyde. Hardening results similar to those observed with formaldehyde were obtained.

EXAMPLES 6-7 AND COMPARATIVE EXAMPLES E AND F

A series of tapes were prepared in which the binder components consisted of the following:
(E) Polyurethane (CA139, Morton-Thiokol)
(F) CA139 and VAGF (Union Carbide). VAGF is a vinyl terpolymer which contains vinyl chloride, vinyl alcohol, and vinyl acetate groups. The ratio of CA139 to VAGF was approximately 3/1 (wt/wt).
(6) Like (E) but with a polyisocyanate (Mondur CB75, Mobay) at 15% (on polymer) level.
(7) Like (F) but with Mondur as in Example 6).

Samples were placed in a closed vessel (1 gal) which contained 50 ml glacial acetic acid and the container incubated at 60° C. for 2 hours. Wipe tests with a cyclohexanone wet cotton swab were as follows:

| Sample | Control (60° C.) | Formaldehyde-acetic acid (60° C.) |
|---|---|---|
| E | 1 | 1 |
| F | 1 | 1 |
| Example 6 | 1 | 4 |
| Example 7 | 1-2 | 3 |

It is evident that samples that do not contain the polyisocyanate do not respond to the acetic acid formaldehyde treatment.

EXAMPLE 8

A sample of a polyisocyanate containing magnetic tape produced by the Sony Corporation (RDAT) was placed for two hours at 60° C. in the formaldehyde acetic acid atmosphere described in Example 6. The treated sample withstood 6 wipes of the cyclohexanone wet swab and the control in which the tape was heated alone failed at the 1-2 wipes. The latter result is the same as that obtained on tape that was not heated.

The invention has been described in detail with particular reference to certain preferred embodiments thereof, but it will be understood that variations and modifications can be effected within the spirit and scope of the invention.

What is claimed is:

1. A method of increasing the hardness of polyurethane medium containing a polyisocyanate by pacing said polyurethane medium in an atmosphere comprising an aldehyde and an acid.

2. The method of claim 1 wherein said polyurethane medium is a magnetic disk or tape.

3. The method of claim 1 wherein said aldehyde is formaldehyde or glutaraldehyde.

4. The method of claim 1 wherein said acid is acetic acid.

* * * * *